Figure 1:
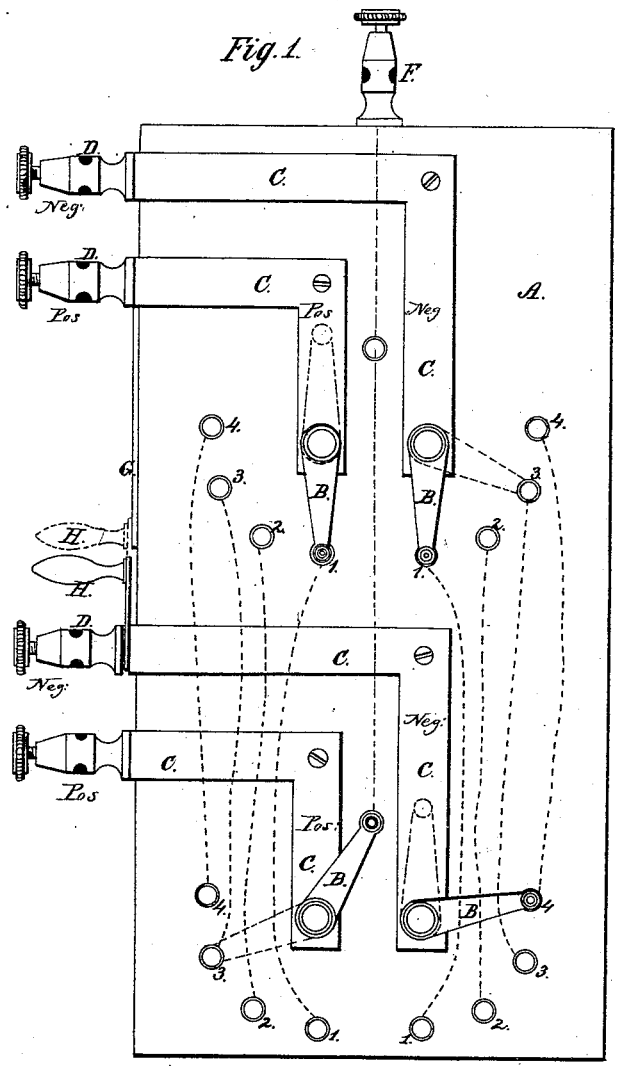

W. G. BROWNSON.
TELEGRAPHIC BATTERY SWITCH BOARD.

No. 66,944. Patented July 23, 1867.

Witnesses,
David A. Burr
H. H. Young

Inventor:
W. G. Brownson

United States Patent Office.

WALTER G. BROWNSON, OF WELLSVILLE, OHIO.

Letters Patent No. 66,944, dated July 23, 1867.

---

IMPROVEMENT IN TELEGRAPH BATTERY SWITCH-BOARD.

---

*The Schedule referred to in these Letters Patent and making part of the same.*

---

TO ALL WHOM IT MAY CONCERN:

Be it known that I, WALTER G. BROWNSON, of Wellsville, in the county of Columbiana, and State of Ohio, have invented an improved Telegraphic Battery Switch-Board; and I do hereby declare the following to be a full, clear, and exact description thereof, reference being had to the accompanying drawing, forming a part of this specification, and representing a top or plan view of my improved switch-board.

The nature of my invention consists in connecting the positive and negative poles of each battery employed in a telegraph office separately, each with an independent switch-button upon a suitable board, every button being within reach of a ground-connecting point or plate and plates or points connecting with each one of the lines entering or leaving the office; also in combining two or more batteries by means of switch-buttons connected with a pole of one battery and turning into contact with a plate connected with the opposite pole of the next battery. I arrange the switch-buttons in pairs corresponding to the number of batteries employed, including the buttons of each pole of a battery in one pair, and make the connection between the battery-pole and its button, either by means of a brass strip or plate, extending on the face of the board from the button to the edge of the board, and there connected by means of a thumb-screw and post to the battery wire, or by attaching the battery wire direct to the shank of the button on the under side of the board.

In the accompanying drawing, A represents a suitable board or tablet of wood, gutta percha, marble, or other material. B B, the switch-button, each pair of which is connected to the opposite poles of a battery. These buttons turn upon brass plates or strips c c, extending to the edge of the board, and provided each with a suitable binding-post and thumb-screw, D, to receive and hold the wires from the batteries. For the sake of convenience and compactness of arrangement I place the pairs of buttons in rows, at a proper distance from the edge of the board, and place the binding-posts along that edge, as seen in the drawing. By thus arranging the battery connections one above the other, the connections from the opposite poles of the different batteries follow each other, and by placing a switch-button, H, upon every alternate battery-plate, and extending a strip or plate, G, from the next adjacent battery-plate within reach of the arm of said button H, I am enabled to unite the opposite poles of the batteries and thus combine their action and concentrate the united force thereof upon any one line. Within reach of the arm of each button B B, and in an arc about its pivot, I place points or plates, 1 2 3 4, &c., corresponding in number to the wires entering or leaving the office, and also a ground-connecting point, E. The corresponding points or plates within reach of each button connected with the positive poles, and of each connected with the negative poles of the batteries, are respectively united upon the board by means of insulated wires on the under side thereof, as indicated by the blue dotted lines in the drawing. The ground-connecting points E are also united by means of a wire from one to the other, connected with a ground wire at the binding-post F upon the edge of the board. This board admits of a great variety of combinations of the batteries with the lines in a telegraphic system. In the drawing, the buttons of each pole of battery 1 are represented as turned upon the points connected with the in and out wires of main line No. 1, so that the battery may work as a through battery upon said line. Of battery 2, the button of its negative pole is turned upon line No. 4, and of its positive pole upon the ground-connecting point E, hence this line would be working through this battery to the ground. To combine these two batteries upon any one line, as for instance line No. 3, I would turn back the positive button of battery 1 and the negative button of battery 2 upon their plates c c respectively, (as indicated by red lines in the drawing,) thus cutting off any connection through them, and turn the positive button of 2 and the negative button of 1 upon the connecting points of line No. 3; then by turning the condensing button H upon the plate G, the two batteries will work together with united power as a through battery on line No. 3. To make it an end battery, either positively or negatively, the one button or the other is turned upon its ground-connecting point E, leaving the others all arranged as just described and as illustrated in red lines, and the line will then work through the two batteries to the ground.

Having thus fully described my invention, what I claim therein as new, and desire to secure by Letters Patent, is—

1. Combining the positive and negative poles of any number of batteries, separately with the lines of a telegraphic system, or with the ground, by means of independent switch-buttons, arranged upon a switch-board to turn into contact with a point connected with the ground and with points or plates connected with each line, all substantially in the manner and for the purpose herein set forth.

2. Combining and uniting any two batteries connected with the lines of a telegraphic system by means of suitable buttons and points or plates upon a switch-board, by means of a condensing key or button H, combined with said board and the battery-connecting devices thereon, all substantially in the manner herein set forth.

Witness my hand this 8th day of February, A. D. 1867.

W. G. BROWNSON.

Witnesses:
DAVID A. BURR,
H. H. YOUNG.